(12) United States Patent
Dodrill et al.

(10) Patent No.: US 8,499,024 B2
(45) Date of Patent: *Jul. 30, 2013

(54) DELIVERING VOICE PORTAL SERVICES USING AN XML VOICE-ENABLED WEB SERVER

(75) Inventors: Lewis Dean Dodrill, Richmond, VA (US); Peter Thomas Garahan, Great Falls, VA (US); Susan Harrow Barban, Midlothian, VA (US)

(73) Assignee: Cisco Technology, Inc., San Jose, CA (US)

( * ) Notice: Subject to any disclaimer, the term of this patent is extended or adjusted under 35 U.S.C. 154(b) by 1589 days.

This patent is subject to a terminal disclaimer.

(21) Appl. No.: 11/119,881

(22) Filed: May 3, 2005

(65) Prior Publication Data

US 2005/0193332 A1    Sep. 1, 2005

Related U.S. Application Data

(63) Continuation of application No. 09/608,188, filed on Jun. 30, 2000, now Pat. No. 6,912,691.

(60) Provisional application No. 60/152,316, filed on Sep. 3, 1999.

(51) Int. Cl.
*G06F 15/16* (2006.01)
(52) U.S. Cl.
USPC .......................................... 709/201; 715/239
(58) Field of Classification Search
USPC ......... 709/230, 231, 232, 246, 250, 203–206; 379/255.01, 255.02, 255.03, 255.04
See application file for complete search history.

(56) References Cited

U.S. PATENT DOCUMENTS

| | | | |
|---|---|---|---|
| 4,837,798 A | | 6/1989 | Cohen et al. |
| 5,196,838 A | * | 3/1993 | Meier et al. .................. 345/684 |
| 5,706,507 A | | 1/1998 | Schloss |
| 5,742,736 A | | 4/1998 | Haddock |
| 5,794,259 A | | 8/1998 | Kikinis |
| 5,864,870 A | | 1/1999 | Guck |
| 5,870,559 A | | 2/1999 | Leshem et al. |
| 5,878,417 A | | 3/1999 | Baldwin et al. |
| 5,892,825 A | | 4/1999 | Mages et al. |
| 5,892,905 A | | 4/1999 | Brandt et al. |
| 5,901,352 A | | 5/1999 | St-Pierre et al. |

(Continued)

OTHER PUBLICATIONS

Using HTML 4, XML, and Java 1.2 by Eric Ladd and Jim O'Donnell et al, Copyright 1999 by Que, first printing :Dec. 1998, Platinum Edition, Title pages, pp. 306-309, 694, 802 (8 pages as printed).*

(Continued)

*Primary Examiner* — Ninos Donabed
(74) *Attorney, Agent, or Firm* — Leon R. Turkevich (57) ABSTRACT

An application server, configured for executing an application defined by XML documents for delivering voice portal services, accesses subscriber attributes from a standardized information database server (such as LDAP). The application server, upon receiving a request from a proxy browser serving a user, accesses the standardized database server to obtain attribute information for responding to the application request. The application server sends a request to a content server for media content based on the HTTP request and the attribute information. The application server generates an HTML page, for execution of the prescribed voice portal service application having XML tags configured for controlling delivery of the media content in an audible format, based on the HTTP request.

38 Claims, 4 Drawing Sheets

U.S. PATENT DOCUMENTS

| | | | |
|---|---|---|---|
| 5,915,001 A * | 6/1999 | Uppaluru | 379/88.22 |
| 6,028,917 A | 2/2000 | Creamer et al. | |
| 6,055,566 A | 4/2000 | Kikinis | |
| 6,055,569 A * | 4/2000 | O'Brien et al. | 709/223 |
| 6,101,473 A * | 8/2000 | Scott et al. | 704/275 |
| 6,173,279 B1 | 1/2001 | Levin et al. | |
| 6,175,562 B1 * | 1/2001 | Cave | 370/352 |
| 6,199,081 B1 | 3/2001 | Meyerzon et al. | |
| 6,243,376 B1 | 6/2001 | Ng et al. | |
| 6,243,676 B1 * | 6/2001 | Witteman | 704/243 |
| 6,243,722 B1 * | 6/2001 | Day et al. | 715/205 |
| 6,269,336 B1 * | 7/2001 | Ladd et al. | 704/270 |
| 6,430,571 B1 * | 8/2002 | Doan et al. | 707/778 |
| 6,446,040 B1 * | 9/2002 | Socher et al. | 704/260 |
| 6,466,971 B1 * | 10/2002 | Humpleman et al. | 709/220 |
| 6,501,832 B1 | 12/2002 | Saylor et al. | |
| 6,539,422 B1 * | 3/2003 | Hunt et al. | 709/217 |
| 6,549,933 B1 * | 4/2003 | Barrett et al. | 709/203 |
| 6,605,120 B1 * | 8/2003 | Fields et al. | 715/239 |
| 6,611,862 B2 | 8/2003 | Reisman | |
| 6,626,958 B1 | 9/2003 | McCauley et al. | |
| 6,675,353 B1 * | 1/2004 | Friedman | 715/239 |
| 6,707,889 B1 * | 3/2004 | Saylor et al. | 379/88.04 |
| 6,922,733 B1 * | 7/2005 | Kuiken et al. | 709/246 |
| 7,620,980 B1 * | 11/2009 | Wood et al. | 726/14 |
| 7,835,896 B1 * | 11/2010 | Rode | 703/14 |
| 2002/0015480 A1 * | 2/2002 | Daswani et al. | 379/88.17 |
| 2002/0044633 A1 * | 4/2002 | Nabha et al. | 379/90.01 |
| 2006/0276201 A1 * | 12/2006 | Dupray | 455/456.1 |
| 2007/0287473 A1 * | 12/2007 | Dupray | 455/456.1 |

OTHER PUBLICATIONS

Extending the web with Phone-Based Voice Browsing by Marc Robins, Sep. 1999 (internet Telephony ), pp. 1-4.*

Companies seek open standard to promote Voice Access to Web Services (AT&T, Lucent Technologies, and Motorola Create VXML Forum) Mar. 2, 1999, Basking Ridge and Murray Hill, N.J, and Chicago, IL, pp. 1-3.*

BOS, "XML in 10 Points", W3.org (Aug. 26, 1999).

Voice XML Forum, Voice Extensible Markup Language "Voice XML", Aug. 17, 1999, Voice XML Forum, Verison 0.9, p. 8.

* cited by examiner

DELIVERING VOICE PORTAL SERVICES USING AN XML VOICE-ENABLED WEB SERVER

CROSS REFERENCE TO RELATED APPLICATIONS

This application is a continuation of application Ser. No. 09/608,188, filed Jun. 30, 2000 now U.S. Pat. No. 6,912,691.

This application claims priority from provisional application No. 60/152,316, filed Sep. 3, 1999, the disclosure of which is incorporated in its entirety herein by reference.

BACKGROUND OF THE INVENTION

1. Field of the Invention

The present invention relates to delivering Voice Portal services to a software application designed for an extensible markup language (XML)-enabled hypertext transport protocol (HTTP) framework.

2. Description of the Related Art

The evolution of the public switched telephone network has resulted in a variety of voice applications and services that can be provided to individual subscribers and business subscribers. Such services include voice messaging systems that enable landline or wireless subscribers to record, playback, and forward voice mail messages. However, the ability to provide enhanced services to subscribers of the public switched telephone network is directly affected by the limitations of the public switched telephone network. In particular, the public switched telephone network operates according to a protocol that is specifically designed for the transport of voice signals; hence any modifications necessary to provide enhanced services can only be done by switch vendors that have sufficient know-how of the existing public switched telephone network infrastructure.

An open standards-based Internet protocol (IP) network, such as the World Wide Web, the Internet, or a corporate intranet, provides client-server type application services for clients by enabling the clients to request application services from remote servers using standardized protocols, for example hypertext transport protocol (HTTP). The web server application environment can include web server software, such as Apache, implemented on a computer system attached to the IP network. Web-based applications are composed of HTML pages, logic, and database functions. In addition, the web server may provide logging and monitoring capabilities.

In contrast to the public switched telephone network, the open standards-based IP network has enabled the proliferation of web based applications written by web application developers using ever increasing web development tools. Hence, the ever increasing popularity of web applications and web development tools provides substantial resources for application developers to develop robust web applications in a relatively short time and an economical manner. However, one important distinction between telephony-based applications and web-based applications is that telephony-based applications are state aware, whereas web-based applications are stateless.

In particular, telephony applications are state aware to ensure that prescribed operations between the telephony application servers and the user telephony devices occur in a prescribed sequence. For example, operations such as call processing operations, voicemail operations, call forwarding, etc., require that specific actions occur in a specific sequence to enable the multiple components of the public switched telephone network to complete the prescribed operations.

The web-based applications running in the IP network, however, are state-less and transient in nature, and do not maintain application state because application state requires an interactive communication between the browser and back-end database servers accessed by the browsers via a HTTP-based web server. However, an HTTP server provides asynchronous execution of HTML applications, where the web applications in response to reception of a specific request in the form of a URL from a client, instantiate a program configured for execution of the specific request, send an HTML web page back to the client, and terminate the program instance that executed the specific request. Storage of application state information in the form of a "cookie" is not practical because some users prefer not to enable cookies on their browser, and because the passing of a large amount of state information as would normally be required for voice-type applications between the browser and the web application would substantially reduce the bandwidth available for the client.

Commonly-assigned, copending application Ser. No. 09/480,485, filed Jan. 11, 2000, entitled Application Server Configured for Dynamically Generating Web Pages for Voice Enabled Web Applications, the disclosure of which is incorporated in its entirety herein by reference, discloses an application server that executes a voice-enabled web application by runtime execution of extensible markup language (XML) documents that define the voice-enabled web application to be executed. The application server includes a runtime environment that establishes an efficient, high-speed connection to a web server. The application server, in response to receiving a user request from a user, accesses a selected XML page that defines at least a part of the voice application to be executed for the user. The XML page may describe any one of a user interface such as dynamic generation of a menu of options or a prompt for a password, an application logic operation, or a function capability such as generating a function call to an external resource. The application server then parses the XML page, and executes the operation described by the XML page, for example dynamically generating an HTML page having voice application control content, or fetching another XML page to continue application processing. In addition, the application server may access an XML page that stores application state information, enabling the application server to be state-aware relative to the user interaction. Hence, the XML page, which can be written using a conventional editor or word processor, defines the application to be executed by the application server within the runtime environment, enabling voice enabled web applications to be generated and executed without the necessity of programming language environments.

Hence, web programmers can write voice-enabled web applications, using the teachings of the above-incorporated application Ser. No. 09/480,485, by writing XML pages that specify respective voice application operations to be performed. The XML documents have a distinct feature of having tags that allow a web browser (or other software) to identify information as being a specific kind or type of information. Hence, the XML documents define the application to be executed by the application server within the runtime environment, enabling voice enabled web applications to be generated and executed without the necessity of programming language environments.

In the past, when a user wanted to access content from the World Wide Web, the user would employ a search engine. More recently, various consolidated web services offer users consolidated access to information such as stock quotes, news, weather horoscopes, etc. Many of these web portal services also offer individualized access to web content once a user indicates what information he or she is interested in accessing. Typically, accessing web portal services requires a personal computer and a web browser so that the user can view the web content at his or her computer monitor. There is a need to be able to access an open-standards-based IP network, such as the World Wide Web, by a mobile device such as a portable telephone.

SUMMARY OF THE INVENTION

There is a need for an arrangement that enables users to access a scalable, open standards based information system on an open standards based network such as an Internet Protocol (IP) network.

There is also a need for an arrangement that delivers voice portal services to a telephone.

These and other needs are attained by the present invention where an application server, configured for executing an application defined by XML documents for delivering voice portal services, accesses subscriber attributes from a standardized information database server. The application server, upon receiving a request from a browser serving the subscriber, accesses the standardized database server to obtain attribute information for responding to the application request. The application server sends a request to a content server for media content based on the HTTP request and the attribute information. The application server generates an HTML page for execution of the prescribed voice portal service application having XML tags configured for controlling delivery of the media content in an audible format, based on the HTTP request.

Another aspect of the present invention provides an application server including a hypertext transport protocol (HTTP) interface for receiving an HTTP request specifying execution of a prescribed voice portal application for a subscriber. The application server also includes an application runtime environment configured for dynamically generating, in response to the HTTP request, a hypertext markup language (HTML) document for execution of the prescribed voice portal service application having XML tags configured for controlling delivery of media content, from a content server, in an audible format based on the HTTP request and on accessing attribute information for the subscriber from an Internet Protocol (IP) based database server configured for storing subscriber attributes.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Figure 1:
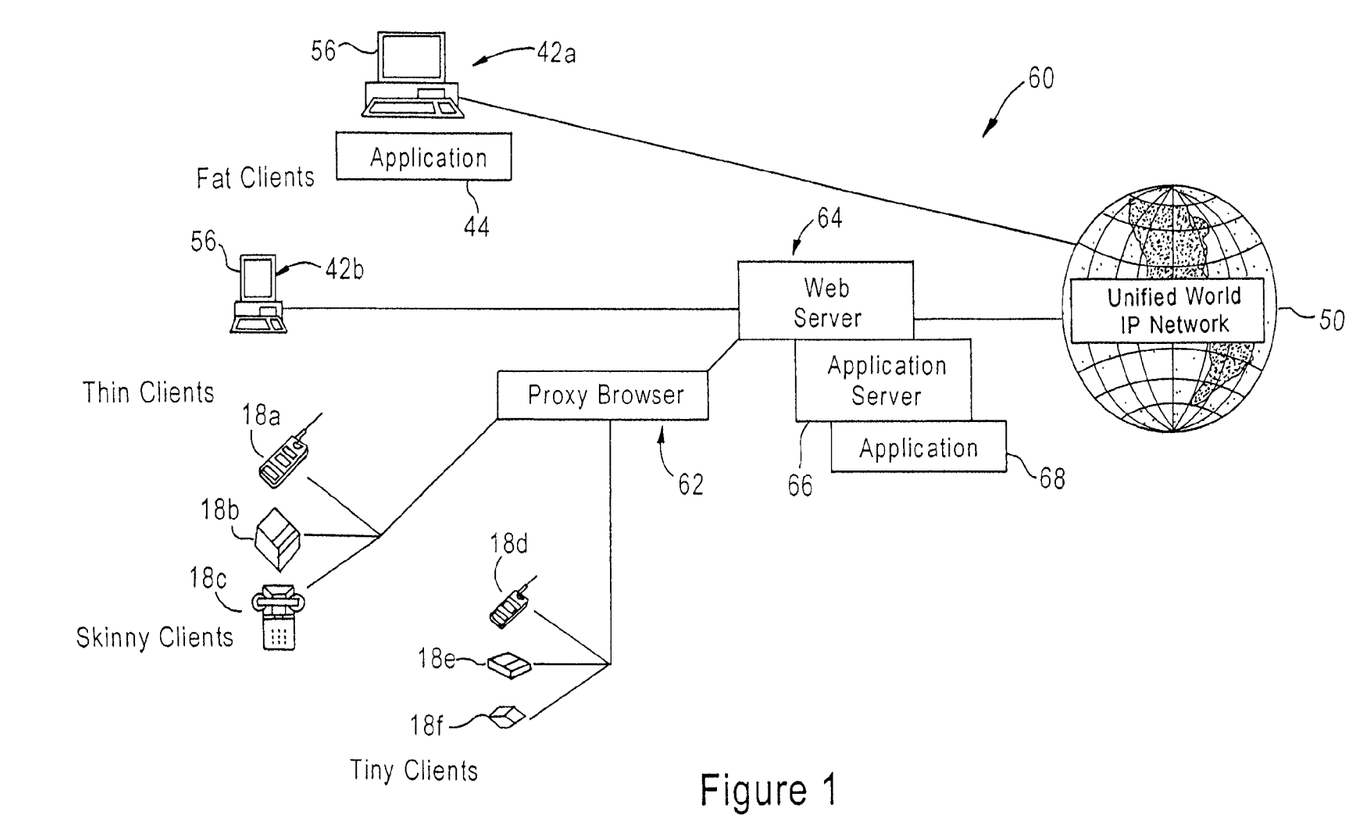
FIG. 1 is a block diagram illustrating a system enabling delivery of voice portal services using an XML voice application server, according to an embodiment of the present invention.

FIG. 1 is a block diagram illustrating an architecture that provides delivery of voice portal services via an IP network using browser audio control according to an embodiment of the present invention. The clients $42a$ and $42b$, referred to herein as "fat clients" and "thin clients", respectively, have the distinct advantage that they can initiate requests using IP protocol to any connected web server 64 to execute part or most of the applications 44 on behalf of the clients. An example of a fat client $42a$ is an e-mail application on a PC that knows how to run the application 44 and knows how to run the IP protocols to communicate directly with the messaging server via the packet switched network 50. An example of a thin client $42b$ is a PC that has a web browser; in this case, the web browser 56 can use IP protocols such as HTTP to receive and display web pages generated according to hypertext markup language (HTML) from server locations based on uniform resource locators (URLs) input by the user of the PC.

As shown in FIG. 1, each of the clients (tiny clients, skinny clients, thin clients and fat clients) are able to communicate via a single, unified architecture 60 that enables voice communications services between different clients, regardless of whether the client actually has browser capabilities. Hence, the fat client $42a$ and the thin client $42b$ are able to execute voice enabled web applications without any hardware modification or any modification to the actual browser; rather, the browsers 56 in the clients $42a$ and $42b$ merely are provided with an executable voice resource configured for providing browser audio control, described below.

The user devices $18a$, $18b$, and $18c$, illustrated as a cordless telephone $18a$, a fax machine $18b$ having an attached telephone, and an analog telephone $18c$, are referred to herein as "skinny clients", defined as devices that are able to interface with a user to provide voice and/or data services (e.g., via a modem) but cannot perform any control of the associated access subnetwork.

The wireless user devices $18d$, $18e$, and $18f$, illustrated as a cellular telephone (e.g., AMPS, TDMA, or CDMA) $18d$, a handheld computing device (e.g., a 3-Com Palm Computing or Windows CE-based handheld device) $18e$, and a pager $18f$, are referred to as tiny clients. "Tiny clients" are distinguishable from skinny clients in that the tiny clients tend to have even less functionality in providing input and output interaction with a user, rely exclusively on the executable application in an access subnetwork to initiate communications; in addition, tiny clients may not be able to send or receive audio signals such as voice signals at all.

Hence, the skinny clients $18a$, $18b$, and $18c$ and the tiny clients $18d$, $18e$, and $18f$ access the unified voice messaging services in the network 60 via a proxy browser 62, configured for providing an IP and HTTP interface for the skinny clients and the tiny clients. In particular, browsers operate by interpreting tags (e.g., HTML tags) within a web page supplied via an HTTP connection, and presenting to a user media content information (e.g., text, graphics, streaming video, sound, etc.) based on the browser capabilities; if a browser is unable to interpret a tag, for example because the browser does not have the appropriate executable plug-in resource, then the browser typically will ignore the unknown tag. Hence, the proxy browser 62 can provide to each of the skinny clients and tiny clients the appropriate media content based on the capabilities of the corresponding client, such that the cordless telephone 18a and telephone 18c would receive analog audio signals played by the proxy browser 62 and no text information (unless a display is available); the fax machine 18b and pager 18f would only receive data/text information, and the cellular telephone 18d and the handheld computing device 18e would receive both voice and data information. Hence, the proxy browser 62 interfaces between the IP network and the respective local access devices for the skinny clients and the tiny clients to provide access to the network 60.

Figure 2:
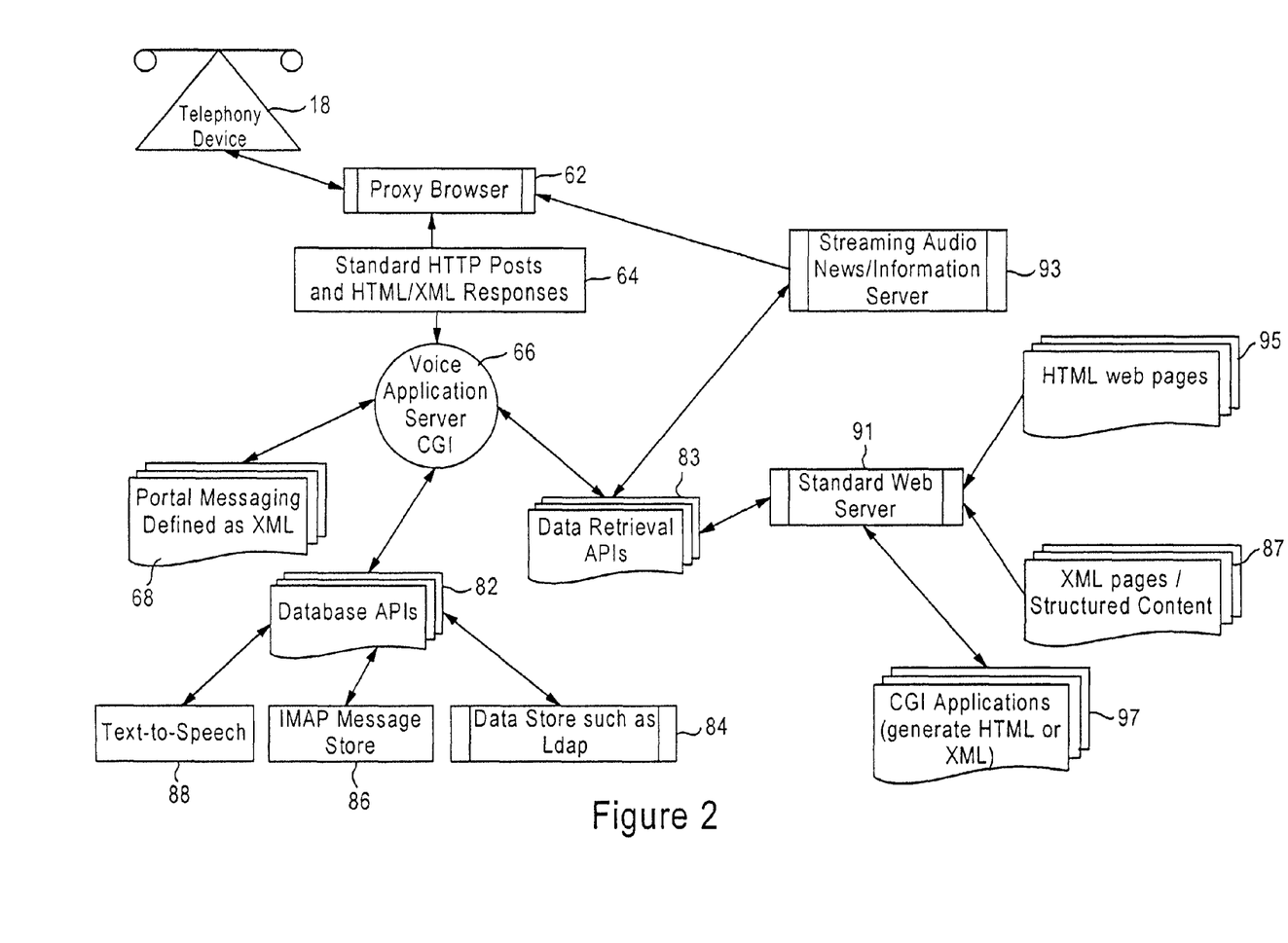
FIG. 2 is a diagram illustrating interactions by the application server of FIG. 1 with resources via an IP network for delivering voice portal services according to an embodiment of the present invention.

The proxy browser 62 and the web browsers 56 within the fat client 42a and the thin client 42b execute voice enabled web applications by sending data and requests to a web server 64, and receiving hypertext markup language (HTML) web pages from the web server 64, according to hypertext transport protocol (HTTP). The web server 64 serves as an interface between the browsers and an application server 66 that provides an executable runtime environment for XML voice applications 68. For example, the web server 64 may access the application server 66 across a common gateway interface (CGI) as illustrated in FIG. 2, by issuing a function call across an application programming interface (API), or by requesting a published XML document or an audio file requested by one of the browsers 56 or 62. The application server 66, in response to receiving a request from the web server 64, may either supply the requested information in the form of an HTML page having HTML tags for display of information by the browser and XML tags for audio control by a voice resource within the browser, or may perform processing and return a calculated value to enable the browser 56 or 62 to perform additional processing.

The application server 66 accesses selected stored XML application pages 68 (i.e., XML pages that define an application) and in response generates new HTML pages having XML tags during runtime and supplies the generated HTML pages having XML tags to the web server 64. Since multiple transactions may need to occur between the browser 56 or 62 and the application server 66, the application server 66 is configured for storing for each existing user session a data record, referred to as a "brownie", that identifies the state of the existing user session; hence, the application server 66 can instantiate a procedure, return the necessary data, and terminate the procedure without the necessity of maintaining the instance running throughout the entire user session.

Hence, the application server 66 executes voice application operations from a stored XML document based on a transient application state, where the application server 66 terminates the application instance after outputting the generated XML media information to the browser 18 or 42.

FIG. 2 is a diagram illustrating in further detail of voice portal service delivery implemented by the voice application server 66 according to an embodiment of the present invention. As described above expect to FIG. 1, the application server 66 receives via the web server 64 HTTP requests from a proxy browser 62 configured for serving as an HTTP interface for a user input device, such as a telephone 18, having limited media capabilities (e.g., audio only). In response to receiving the HTTP request, the voice application server 66 accesses a selected XML document 68 based on parameters specified within the HTTP request (e.g., commands specified within the URL), and based on application state determined from accessing a brownie, assuming the HTTP request specifies a valid session identifier. As described below, the application runtime environment within the voice application server 66 parses the XML tags within the accessed XML document 68, and dynamically generates an HTML page having XML tags that specify media content (e.g., .wav files) and control information for playing the media files by the corresponding browser 62.

The voice application server 66 is configured for accessing application programming interfaces (APIs) 82 to external resources based on prescribed procedures that may be called during parsing of an XML tags in a selected XML document 68. As described below, the application server 66 issues function calls to APIs 82 for accessing the external resources for prescribed operations, enabling the deployment of a robust, scalable unified messaging system having messaging operations distributed across multiple platforms. In particular, the application server 66 accesses subscriber profile information from an IP-based database server 84 according to LDAP protocol. The attribute information may include subscriber preferences and device capabilities (e.g., whether the subscriber device has audio, text, and/or image capabilities). As disclosed in commonly assigned, co-pending application Ser. No. 09/588,293, filed Jun. 7, 2000, entitled Unified Messaging System Using Web Based Application Server For Management of Messages Using Standardized Servers, the disclosure of which is incorporated in its entirety by reference, the application server 66 is configured for storing and retrieving messages in a standardized format (e.g., e-mail with binary encoded attachments) in an IMAP messaging server 86. In addition, the application server 66 may issue function calls for a text to speech resource 88. Hence, the voice application server 66 may access the text to speech resource 88 for converting an e-mail message into a audio-based message to be played for the user of the telephony device 18.

The voice application server 66 is also configured for accessing data retrieval APIs 83. In particular, from the APIs 83, the application server 66 can retrieve content such as XML web pages or structured e-mail 87 through a standard web server 91. Steaming audio news can be retrieved from a streaming information server 93. Furthermore, content from standard HTML web pages 95, can be retrieved using the APIs 83. Examples include "My Yahoo" type pages in which the subscriber has defined his or her profile information at the portal and a cookie is used to retrieve the information for the subscriber. A Common Gateway Interface (CGI) 97 is provided for searching a database using a database query (e.g., stock quote,) generated by the application server.

Figure 3:
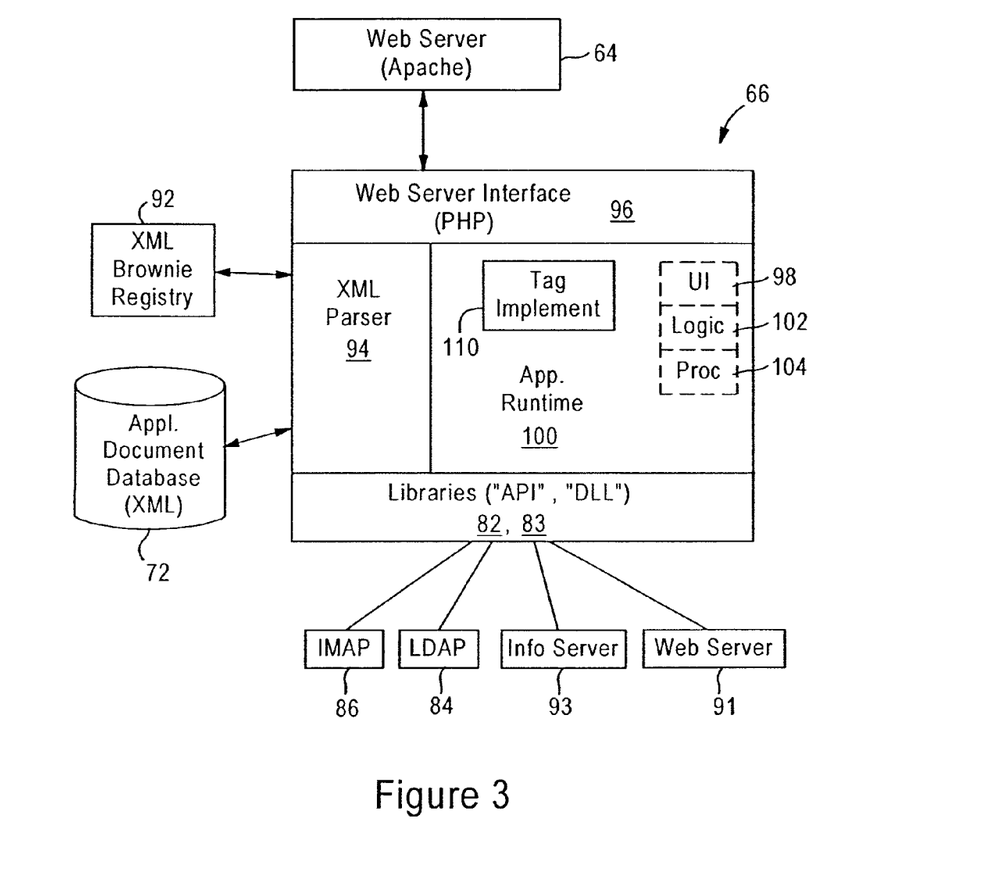
FIG. 3 is a diagram illustrating in detail the application server of FIGS. 1 and 2 according to an embodiment of the present invention.

FIG. 3 is a diagram illustrating in detail the application server 66 according to an embodiment of the present invention. The application server 66 is implemented as a server executing a PHP hypertext processor with XML parsing and processing capabilities, available open source on the Internet at http://www.php.net. As shown in FIG. 3, the server system 66 includes an XML parser 94 configured for parsing the application-defining XML documents 68 stored in the XML document database 72, or the XML documents (i.e., "brownies") stored in the registry 92 and configured for specifying the state and attributes for respective user sessions. The application server 66 also includes a high speed interface 96 that establishes a high-speed connection between the application server 66 and the web server 64. For example, the PHP hypertext processor includes a high-speed interface for Apache Web servers.

The application server 66 also includes a runtime environment 100 for execution of the parsed XML documents. As described above, the runtime environment 100 may selectively execute any one of user interface operation 98, a logic operation 102, or a procedure call 104 as specified by the parsed XML document by executing a corresponding set of executable functions based on the rule set for the corresponding operation. In particular, the application runtime environment 100 includes a tag implementation module 110 that implements the XML tags parsed by the XML parser 94. The tag implementation module 110 performs relatively low-level operations, for example dynamically generating an XML menu page using executable functions specified by a menu rule set in response to detecting a menu tag, performing a logical operation using executable functions specified by a logic rule set in response to a decision tag, or fetching an audio (.wav) file in response to detecting a sound tag. Hence, the tag implementation module 110 implements the tag operations that are specified within the XML framework of the stored XML documents.

The application server 66 also includes a set of libraries 82, 83 that may be implemented as dynamically linked libraries (DLLs) or application programming interface (API) libraries. The libraries 82 and 83 enable the runtime environment 100 to implement the procedures 104 as specified by the appropriate XML document. The application server 66 may issue a function call to one of a plurality of IP protocol compliant remote resources 86, 88, 91, or 93. Note that the mechanisms for accessing the services 86,88,91, or 93 should be established within the application server before use of XML documents that reference those services. Once the services 86, 88, 91, or 93 are established, the application runtime environment 100 can perform a function operation by using executable functions specified by a function call rule set.

The arrangement for delivering voice portal services will now be described.

Figure 4:
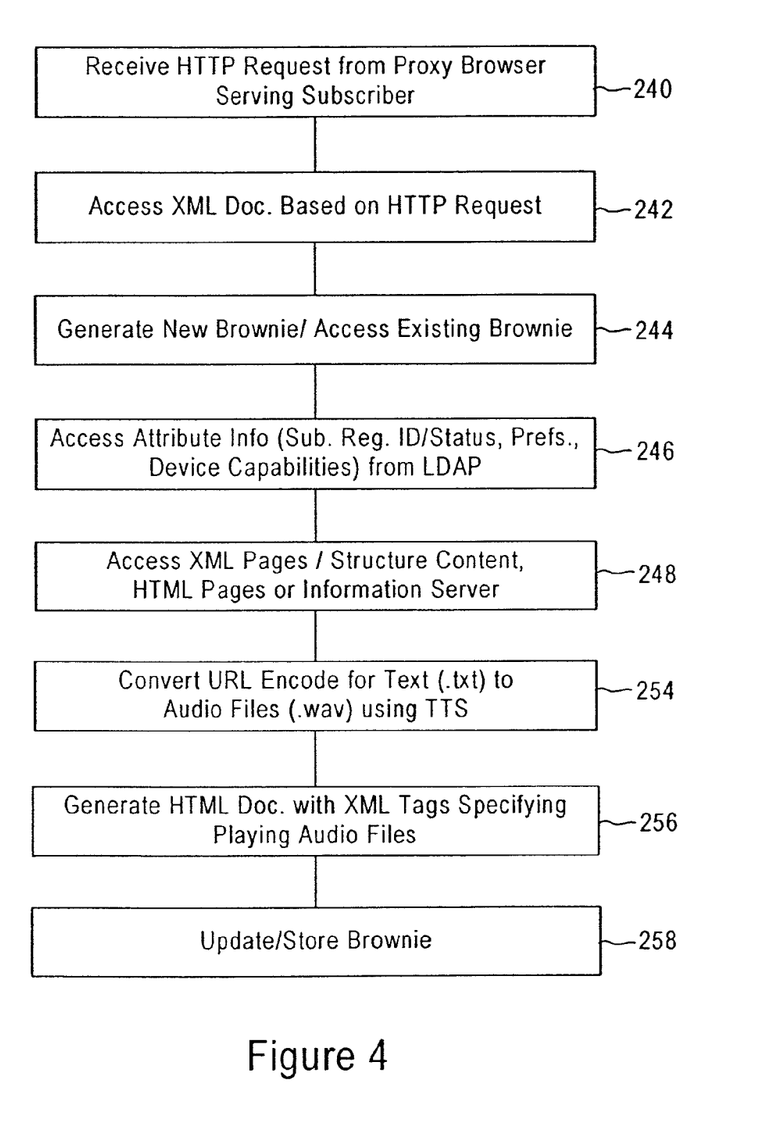
FIG. 4 is a diagram illustrating the delivery of voice portal services according to an embodiment of the present invention.

FIG. 4 is a diagram illustrating delivery of voice portal services executed by the application server 66 according to an embodiment of the present invention. The steps described in FIG. 4 can be implemented as executable code stored on a computer readable medium (e.g., a hard disk drive, a floppy drive, a random access memory, a read only memory, an EPROM, a compact disc, etc.).

The application server 66 accesses news, weather, sports, stock, etc, information using the data retrieval API 83 to obtain content information from the steaming information server 93, XML pages or structured content 87 or the HTML web pages via the web server 91. The application server 66 is configured for delivering web portal services by obtaining subscriber information from the LDAP directory 84. For example, the subscriber information may include subscriber device capabilities and subscriber preferences such as a personalized menu of subjects for which the subscriber wishes to receive information. For example, subscriber information may include subscriber preferences for subscriber information services such as ""My Yahoo", normally stored for a browser using a cookie; in this case, the cookie may be stored in the LDAP directory 84 (or generated by the application server 66), causing the API 83 to output an HTTP GET request having the cookie for retrieval of the personalized content from the content server 91.

As illustrated in FIG. 4, the application server 66 receives in step 240 an HTTP request from the proxy browser 62 serving the subscriber. In response, the application server 66 accesses an XML document 68 from the database 72 in step 242, and generates a new brownie or accesses an existing brownie in step 244 to determine what web content the subscriber wishes to receive. The application server 66 then accesses the subscriber attribute information in step 246 from the LDAP directory 84, for example subscriber identity, subscriber status, preferences, and device capabilities. The application server 66 also retrieves from the web server 91, based on the subscriber attribute information obtained in step 246, the XML pages/structured content 87, or the HTML pages 95 through the API 83 in step 248. The application server 66 also may retrieve streaming information (e.g., a URL) from the information server 93 to enable the browser 62 to initiate transmission of a media stream from the server 93. The application server 66 adds media content such as audio (.wav) files (or URL's that point to the audio files) to the accessed web pages containing the information and/or converts accessed text based information into audio files using the text-to-speech resource 88 in step 254. The application server 66 then generates an HTML document having XML tags that specify parameters of reception of the media stream and the proxy browser 62 plays the media stream for the subscriber. For non-streaming information, the application server generates an HTML document having XML tags that specify playing of the audio files in step 256 and forwards the HTML document to the proxy browser 62 for playing the files to the subscriber. The application server 66 then updates and stores the brownie in step 258.

Hence, the subscriber can receive, via a telephone 18, voice portal services. More detailed information can be obtained by use of menus such as, "To receive stock quotes, press 1, to receive headline news, press 2" and so on. Once the input is made, the application server 66 can generate a second HTML document having instructions to retrieve the detailed information requested. Further menus can be used by the subscriber to gain even more detailed information such as the price of a particular stock.

The XML document 68 can include the subscriber's telephone number so that, for example, if a stock of interest reaches a certain price, the application server 66 can generate another HTML document with tags to instruct the proxy browser 62 to cause a telephony device to call or page the subscriber.

According to the disclosed embodiment, delivery of voice portal services may be deployed on a platform that is customizable, scalable, and built upon open standards such as Internet protocol. Users can access portal services via PC-based browser or via a telephone and proxy browser.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in an application server for executing an application to deliver voice portal services, the method comprising:

receiving a HTTP request for execution of a prescribed voice portal service application for a browser serving a subscriber;

accessing attribute information for the subscriber from an Internet Protocol (IP) based database server for storing subscriber attributes;

sending a request to a content server for media content based on the HTTP request and the attribute information; and     generating, based on the HTTP request and the attribute information, an HTML page for execution of the prescribed voice portal service application by the browser, the HTML page having HTML tags for selective display of information by the browser and XML tags for controlling delivery by the browser of the media content in an audible format.

2. The method of claim 1, wherein the receiving step includes recovering within the HTTP request a browser configuration.

3. The method of claim 2, wherein the recovering step includes identifying the browser configuration as one of a computer browser configuration for parsing a prescribed group of media tags and presenting a prescribed group of media types, or a lightweight browser configuration for parsing a prescribed portion of the prescribed group of media tags.

4. The method of claim 3, wherein the generating step includes generating the HTML page by selectively supplying media tag types based on the identified browser configuration.

5. The method of claim 1, wherein the accessing step includes accessing the IP-based database server according to LDAP protocol.

6. The method of claim 1, wherein the step of sending a request includes using a data retrieval application programming interface to access the content server.

7. The method of claim 6, further comprising converting text based information obtained from the content server into a media file having at least one prescribed media type.

8. The method of claim 7, wherein the converting step includes converting the text based information into a .wav file playable by the browser.

9. The method of claim 8, wherein the step of generating an HTML page includes inserting a first media tag including the .wav file and a second media tag for playing the .wav file.

10. The method of claim 7, wherein the converting step includes executing a text to speech resource for converting the text based information into an audio file.

11. The method of claim 1, further comprising generating second HTML page in response to an input indicating particular information of interest received from the subscriber, having instructions to access the particular information.

12. The method of claim 1, wherein the step of accessing attribute information includes accessing subscriber preferences defining information which the subscriber wishes to receive.

13. An application server for executing an application for delivering voice portal services, the application server including:
    a hypertext transport protocol (HTTP) interface for receiving an HTTP request specifying execution of a prescribed voice portal application for a browser serving a subscriber; and
    an application runtime environment for dynamically generating, in response to the HTTP request, a hypertext markup language (HTML) document for execution of the prescribed voice portal service application by the browser, the HTML document having HTML tags for selective display of information by the browser and XML tags for controlling delivery by the browser of media content, from a content server, in an audible format based on the HTTP request and based on accessing attribute information for the subscriber from an Internet Protocol
    (IP) based database server for storing subscriber attributes, wherein the application server is implemented using a non-transitory computer readable medium.

14. The server of claim 13, wherein the application runtime environment accesses the IP-based database server according to LDAP protocol.

15. The server of claim 13, wherein the application runtime environment is for instructing a data retrieval application programming interface to access the content server.

16. The server of claim 13, wherein the application runtime environment is for converting text based information, obtained from the content server, into a media file having at least one prescribed media type.

17. The server of claim 16, wherein the application runtime environment is for converting the text based information into a .wav file playable by the browser.

18. The server of claim 16, wherein application runtime environment is for executing a text to speech resource for converting the text based information into an audio file.

19. The server of claim 13, wherein the attribute information includes subscriber preferences defining information which the subscriber wishes to receive.

20. A non-transitory computer readable medium having stored thereon sequences of instructions for executing an application to deliver voice portal services, the sequences of instructions including instructions for performing the steps of:
    receiving a HTTP request for execution of a prescribed voice portal service application for a browser serving a subscriber;
    accessing attribute information for the subscriber from an Internet Protocol (IP) based database server for storing subscriber attributes;
    sending a request to a content server for media content based on the HTTP request and the attribute information; and
    generating, based on the HTTP request and the attribute information, an HTML page for execution of the prescribed voice portal service application by the browser, the HTML page having HTML tags for selective display of information by the browser and XML tags for controlling delivery by the browser of the media content in an audible format.

21. The medium of claim 20, wherein the receiving step includes recovering within the HTTP request a browser configuration.

22. The medium of claim 21, wherein the recovering step includes identifying the browser configuration as one of a computer browser configuration for parsing a prescribed group of media tags and presenting a prescribed group of media types, or a lightweight browser configuration for parsing a prescribed portion of the prescribed group of media tags.

23. The medium of claim 21, wherein the generating step includes generating the HTML page by selectively supplying media tag types based on the identified browser configuration.

24. The medium of claim 20, wherein the accessing step includes accessing the IP-based database server according to LDAP protocol.

25. The medium of claim 20, wherein the step of sending a request includes using a data retrieval application programming interface to access the content server.

26. The medium of claim 25, further comprising converting text based information obtained from the content server, into a media file having at least one prescribed media type.

27. The medium of claim 26, wherein the converting step includes converting the text based information into a .wav file playable by the browser.

28. The medium of claim 26, wherein the step of generating an HTML page includes inserting a first media tag including the .wav file and a second media tag for playing the .wav file.

29. The medium of claim 25, wherein the converting step includes executing a text to speech resource for converting the text based information into an audio file.

30. The medium of claim 20, further comprising generating second HTML page in response to an input indicating particular information of interest received from the subscriber, having instructions to access the particular information.

31. The medium of claim 20, wherein the step of accessing attribute information includes accessing subscriber preferences defining information which the subscriber wishes to receive.

32. An application server for executing an application for delivering a voice portal service, the application server including:
 a hypertext transport protocol (HTTP) interface for receiving an HTTP request specifying execution of a prescribed voice portal application for a browser serving a subscriber; and
 means for dynamically generating, in response to the HTTP request, a hypertext markup language (HTML) document for execution of the prescribed voice portal service application by the browser, the HTML document having HTML tags for selective display of information by the browser and XML tags for controlling delivery by the browser of media content, from a content server, in an audible format based on the HTTP request and on accessing attribute information for the subscriber from an Internet Protocol (IP) based database server for storing subscriber attributes, wherein the application server is implemented using a non-transitory computer readable medium.

33. The server of claim 32, wherein the generating means is to access the IP based database server according to LDAP protocol.

34. The server of claim 32, wherein the generating means is to instruct a data retrieval application programming interface to access the content server.

35. The server of claim 32, wherein the generating means is for converting text based information into a media file having at least one prescribed media type.

36. The server of claim 35, wherein the generating means is for converting the text based information into a .wav file playable by the browser.

37. The server of claim 35, wherein generating means is for executing a text to speech resource for converting the text based information into an audio file.

38. The server of claim 32, wherein the attribute information includes subscriber preferences defining information which the subscriber wishes to receive.

* * * * *